(12) United States Patent
Uesaka

(10) Patent No.: US 6,781,741 B2
(45) Date of Patent: Aug. 24, 2004

(54) MACH-ZEHNDER OPTICAL MODULATOR

(75) Inventor: Kouichi Uesaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 12 days.

(21) Appl. No.: 10/198,914

(22) Filed: Jul. 19, 2002

(65) Prior Publication Data

US 2003/0165001 A1 Sep. 4, 2003

(30) Foreign Application Priority Data

Mar. 4, 2002 (JP) ........................................ 2002-056857

(51) Int. Cl.⁷ ............................ G02F 1/01; G02F 1/00; G02F 1/035; H04J 14/08; H04B 10/04
(52) U.S. Cl. ........................ 359/279; 359/237; 398/98; 398/182; 398/188; 385/3; 385/14
(58) Field of Search ................................. 359/237, 245, 359/239, 279; 398/98, 82, 182, 183, 187, 188; 385/2, 3, 4, 8, 14

(56) References Cited

U.S. PATENT DOCUMENTS 5,101,450 A * 3/1992 Olshansky ..................... 385/3
5,907,421 A * 5/1999 Warren et al. ............... 398/182
5,917,628 A * 6/1999 Ooi et al. ....................... 398/98
6,341,184 B1 * 1/2002 Ho et al. ......................... 385/3

FOREIGN PATENT DOCUMENTS

JP          10-112688          4/1998

* cited by examiner

*Primary Examiner*—Loha Ben
(74) *Attorney, Agent, or Firm*—Townsend and Townsend and Crew LLP

(57) ABSTRACT

A Mach-Zehnder optical modulator that can attain a higher transmission speed than the driver signal speed but also attains, by setting multi-value amplitudes, an information transmission volume corresponding to an integer multiple of a single driver while allowing the transmission speed to remain as it is, wherein plural optical waveguide branches and plural Mach-Zehnder modulator portions are used, and by utilizing a propagation delay of a modulation signal for driving each of the modulator portions there is attained a transmission speed proportional to the delay time. This leads to a transmission signal having a frequency higher than the cut-off frequency of, for example, an IC or a transmission line substrate having an electrical characteristic of generating and propagating a modulation signal in such a form as an optical MUX (multiplexer).

8 Claims, 13 Drawing Sheets

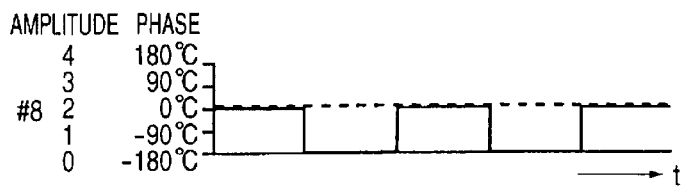
FIG. 2(g) #8
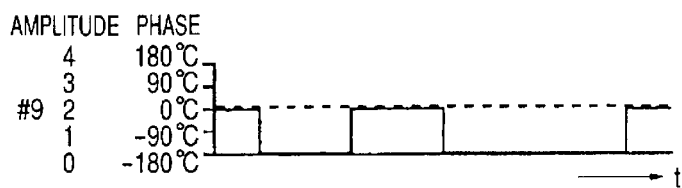
FIG. 2(h) #9
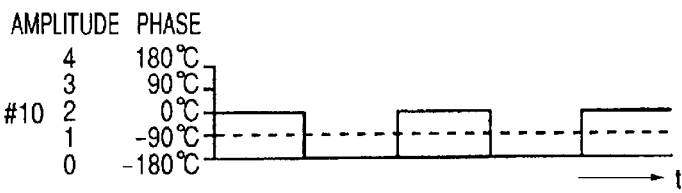
FIG. 2(i) #10
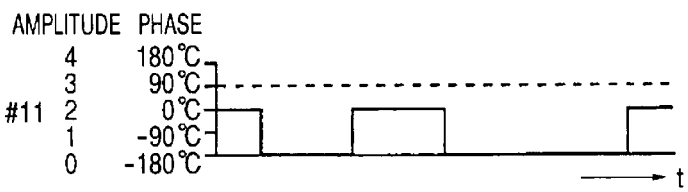
FIG. 2(j) #11
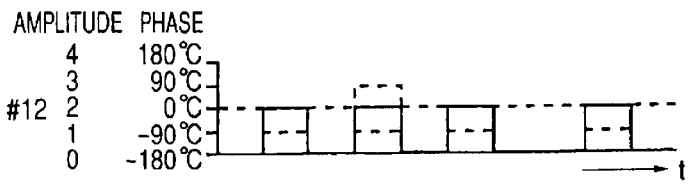
FIG. 2(k) #12

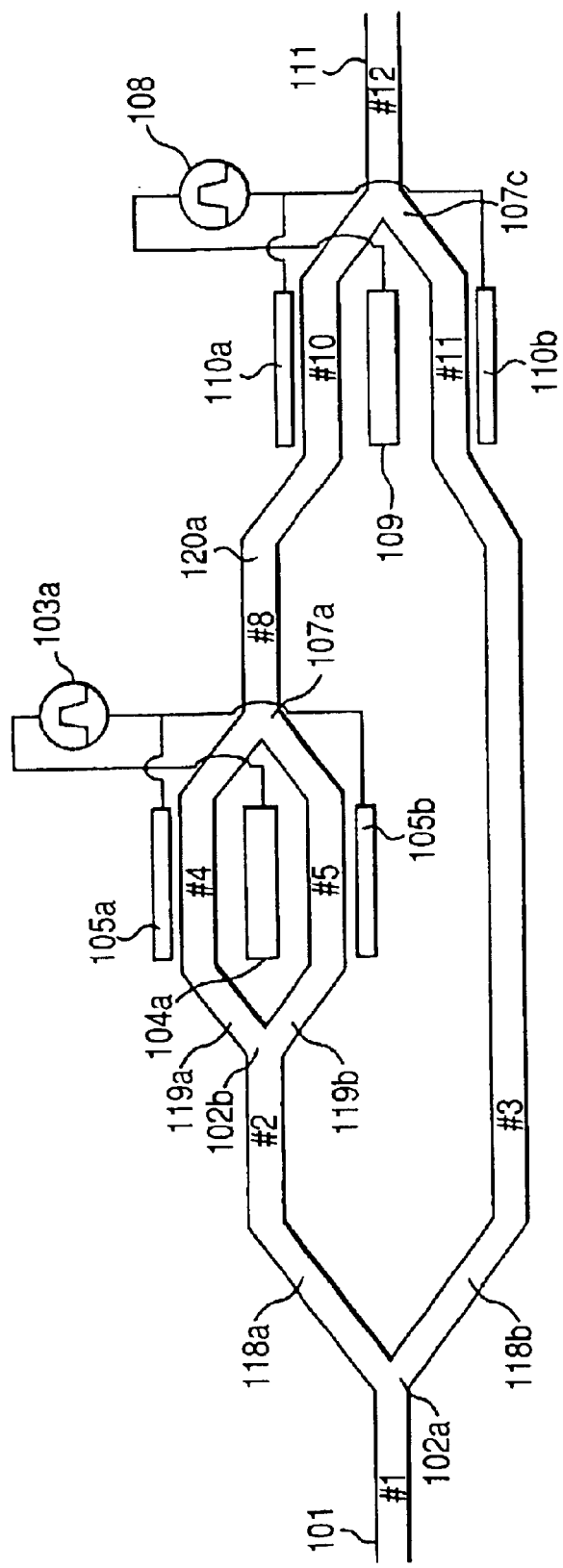

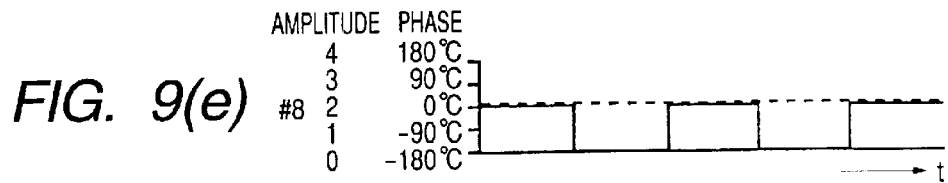
FIG. 9(e) #8
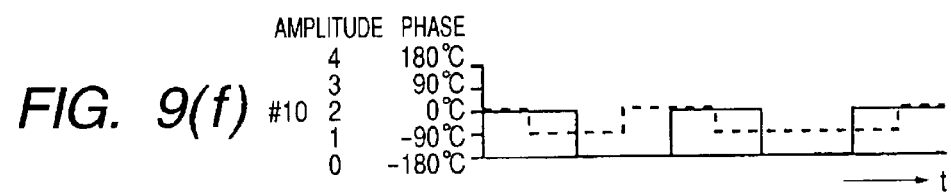
FIG. 9(f) #10
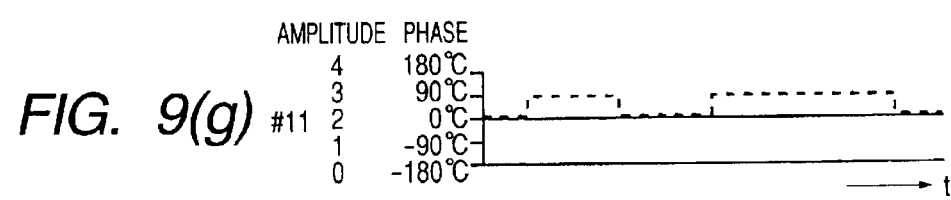
FIG. 9(g) #11
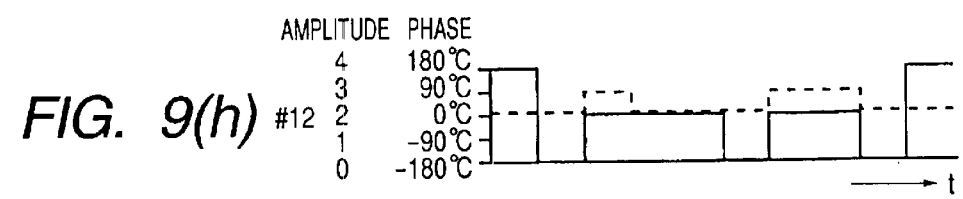
FIG. 9(h) #12

MACH-ZEHNDER OPTICAL MODULATOR

BACKGROUND OF THE INVENTION

The present invention relates to a modulator in an optical transmission module and more particularly to a Mach-Zehnder optical modulator.

Heretofore, as a modulator for an optical transmission module there have been known an electric absorption (EA) type and a Mach-Zehnder interferometer type. The electric absorption type modulator utilizes a mechanism such that if a modulation signal voltage is applied to light propagated through a waveguide, the resulting electric field causes an electric absorption coefficient in a medium to change, thereby intercepting the light. On the other hand, the Mach-Zehnder interferometer type utilizes a mechanism such that when light propagated through a waveguide is branched in two directions and a modulation signal current is flowed through the center of each branch, there occur magnetic fields of opposite phases with respect to grounds provided on opposite sides in a sandwiching relation to the waveguides, so that the phases of light signals propagated through the respective routes become opposite to each other and the phase lead and lag are offset each other when both lights are later combined together. It is the Mach-Zehnder modulator that utilizes this mechanism.

FIGS. 10 to 12 are schematic diagrams showing a schematic construction of the conventional Mach-Zehnder modulator. In these figures, light guided through an optical waveguide 101 is branched to two optical waveguides 117a and 117b at an optical waveguide branch point 102 and the light signals propagated respectively through the optical waveguides 117a and 117b are changed in phase by electric fields developed between an electrode 104 and grounds 105a, 105b in accordance with a modulation signal generated by a modulation signal generator 103. FIG. 11 shows a case where the modulation signal generator 103 is OFF, while FIG. 12 shows a case where the modulation signal generator 103 is ON.

With the modulation signal generator 103 OFF as in FIG. 11, the light signals propagated through the branched waveguides are joined at a junction 106 without any change like their branching at the branch point 102, so that there is no change in the light signal before and after the modulator. On the other hand, when the modulation signal generator 103 is ON as in FIG. 12, refractive indices in the waveguides are changed by electric fields generated respectively between the electrode 104 and the ground 105a and between the electrode 104 and the ground 105b (Pockels effect), resulting in that the light signals propagated through the waveguides 117a and 117b become ±90° out of phase with each other and become 180° out of phase at the junction 106. This can offset the phase lead and lag. Thus, a modulation signal can be imparted to light. In this single Mach-Zehnder modulator, however, the driver's speed is an upper limit of the transmission speed.

JP-A-112688/1998 discloses a duobinary signal generating method wherein a semiconductor laser, a light intensity modulator and an optical phase modulator are cascaded and one branched signal is subjected to light intensity modulation, while the other signal is subjected to optical phase modulation.

SUMMARY OF THE INVENTION

Above-described conventional methods are unable to attain a higher transmission speed than a driver signal which drives the modulator. Besides, since it is only whether light passes or is cut off that is available as a working mode, it has been impossible, either, to set multi-value amplitudes. Therefore, for example in such a high-speed signal propagation as exceeds 40 Gbps, a restriction has heretofore been placed by a driver circuit or by a line which is for propagation of the signal to a modulator, independently of characteristics of a laser diode (LD) and an optical fiber.

In the JP-A-112688/1998, light is phase-modulated and therefore, in case of transmitting light with optical fiber over along distance, it is difficult to reproduce a light signal accurately because the phase changes.

It is an object of the present invention to solve the above-mentioned problems and provide a Mach-Zehnder optical modulator wherein conventional driver circuit and transmission line left intact, a modulator is used like an optical MUX (multiplexer) and a signal corresponding to an integer multiple of a signal generated by a single driver circuit is used to permit an increase in the amount of information capable of being transmitted during a certain period of time.

It is another object of the present invention to provide a Mach-Zehnder optical modulator wherein the amount of information capable of being transmitted can be increased by multi-value amplitudes although the transmission speed remains the same.

For achieving the objects, according to one aspect of the invention, there is provided a Mach-Zehnder optical modulator comprising: a first modulation signal generator for generating a first modulation signal to modulate light signals guided by first and second optical waveguides, the modulation being conducted so that the phases of the light signals become opposite to each other; and a second modulation signal generator for generating a second modulation signal to modulate light signals guided by third and fourth optical waveguides, the modulation being conducted so that the phases of the light signals become opposite to each other; wherein the transmission speed or the amount of information transmitted is increased in accordance with modulation signals provided from the first and second modulation signal generators.

In the aspect of the invention, there is provided means for generating a phase shift between the first and second modulation signals generated from the first and second modulation signal generators respectively, a phase between light signals modulated respectively in the first and second optical waveguides and in the third and fourth optical waveguides is changed, and thereafter both light signals are combined together and outputted.

There is also provided means for generating a phase shift between first and second modulation signals generated from the first and second modulation signal generators respectively, and the third optical waveguide is a joined optical waveguide of both first and second optical waveguides.

Further, the quantity of light passing through the first and second optical waveguides and the quantity of light passing through the third and fourth optical waveguides are made different from each other and the first to fourth optical waveguides are joined together to provide an output.

According to an another aspect of the invention, there is provided a Mach-Zehnder optical modulator which modulates a light signal propagated through an optical waveguide in accordance with a modulation voltage applied, the optical waveguide having plural, at least two, branches, and which comprises plural, at least two, Mach-Zehnder optical modulator portions for modulating light signals propagated through optical waveguides in accordance with the modulation voltage.

Other and further objects, features and advantages of the invention will appear more fully from the following description.

BRIEF DESCRIPTION OF THE DRAWINGS

A preferred form of the present invention illustrated in the accompanying drawings in which:

FIG. 8 is a schematic diagram showing a Mach-Zehnder optical modulator according to a fourth embodiment of the present invention;

DETAILED DESCRIPTION OF THE INVENTION

The present invention will be described hereinunder by way of embodiments thereof and with reference to the accompanying drawings.

Figure 1:
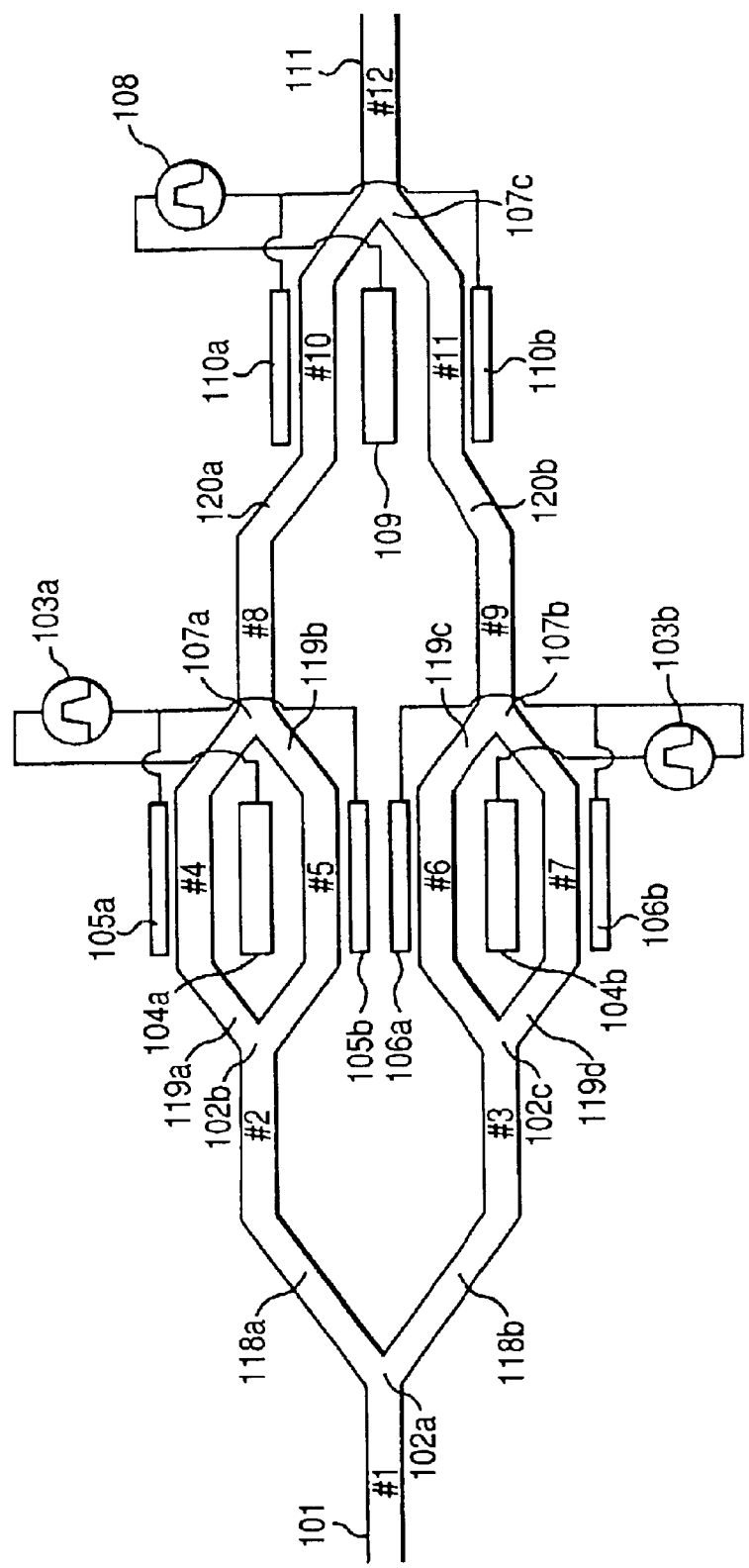
FIG. 1 is a schematic diagram showing a Mach-Zehnder optical modulator according to a first embodiment of the present invention.

A first embodiment of the present invention is now described with reference to FIGS. 1 and 2. FIG. 1 schematically illustrates a Mach-Zehnder optical modulator according to the first embodiment. FIG. 2 illustrates amplitudes and phases of light signals in optical waveguides shown in FIG. 1, in which time t is plotted along the axis of abscissa, while phases −180°, −90°, 0°, 90°, 180° and amplitudes 1, 2, 3, 4 are plotted along the axis of ordinate. The phases are represented by dotted lines and the amplitudes are represented by solid lines.

Figure 2A:
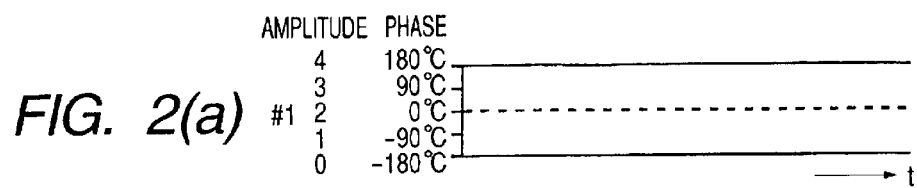
FIG. 2 is a diagram showing amplitudes and phases of light signals in optical waveguides.
Figure 2B:
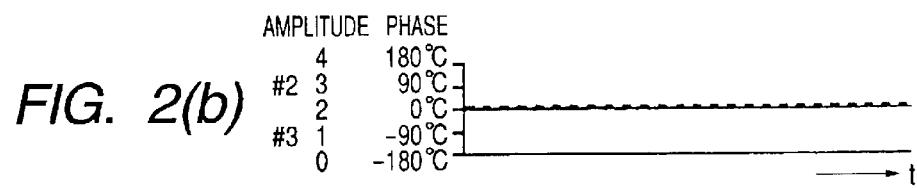
Figure 2C:
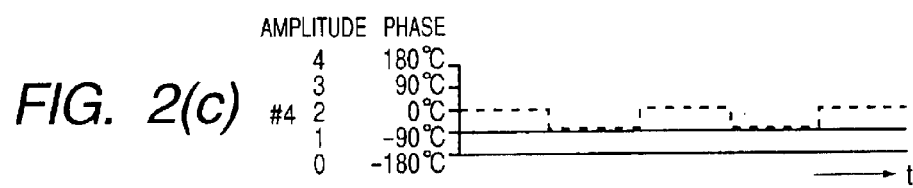
Figure 2D:
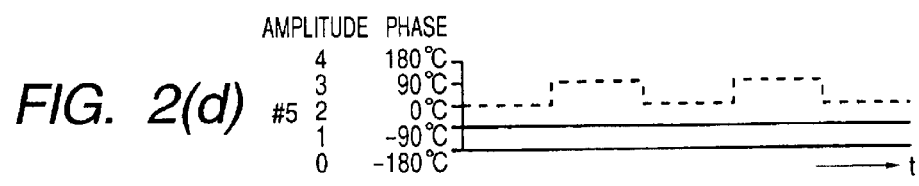

A light signal propagated through an optical waveguide 101 in FIG. 1 is a signal having an amplitude of unit 4 and a phase of 0, i.e., an amplitude 4, phase 0 signal (#1), as shown in FIG. 2A. At a branch point 102a, this signal is divided into two signals, which are conducted to optical waveguides 118a and 118b, respectively. The signals in the optical waveguides 118a and 118b are amplitude 2, phase 0 light signals (#2) and (#3) each having an amplitude of unit 2 and a phase of 0, as shown in FIG. 2B. These light signals are each divided into two light signals at branch points 102b and 102c respectively which are provided in the optical waveguides. The light signals branched at the branch point 102b are conducted to optical waveguides 119a and 119b, respectively. And, electric fields are developed between an electrode 104a and a ground 105a and also between the electrode 104a and a ground 105b in accordance with a modulation signal generated from a modulation signal generator 103a. The phase is changed with the electric fields. The signal in the optical waveguide 119a becomes a signal (#4) of amplitude 1 and phase 0 or −0.5π, as shown in FIG. 2C, while the signal in the optical waveguide 119b becomes a signal (#5) of amplitude 1 and phase 0 or 0.5π (0/0.5π), as shown in FIG. 2D.

Likewise, the light signals branched at the branch point 102c are conducted to optical waveguides 119c and 119d, respectively. And, electric fields are developed between an electrode 104b and a ground 106a and also between the electrode 104b and a ground 106b in accordance with a modulation signal generated from a modulation signal generator 103b which modulation signal has a time lag of ½ clock relative to the modulation signal generated from the modulation signal generator 103a. The phase is changed with the electric fields.

Figure 3:
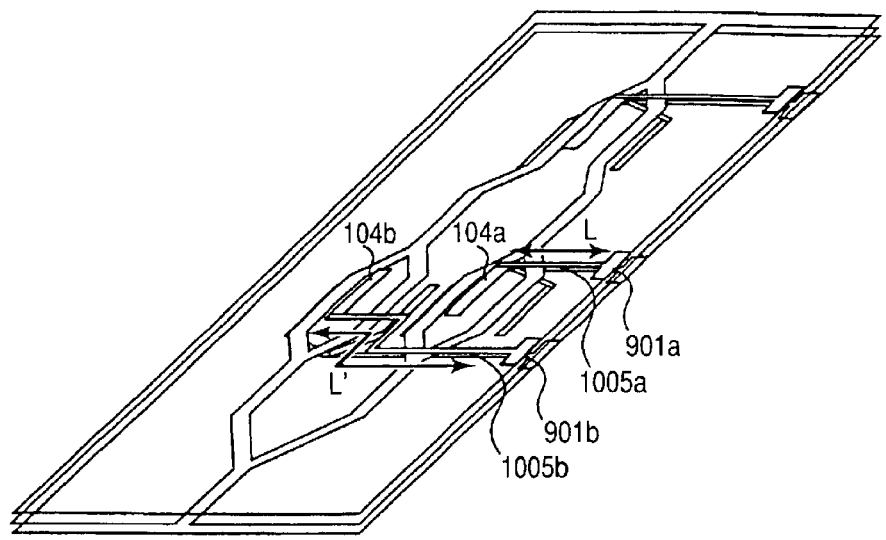
FIG. 3 is a schematic diagram showing an example of delaying the phase of a modulation signal in the Mach-Zehnder optical modulator.
Figure 4:
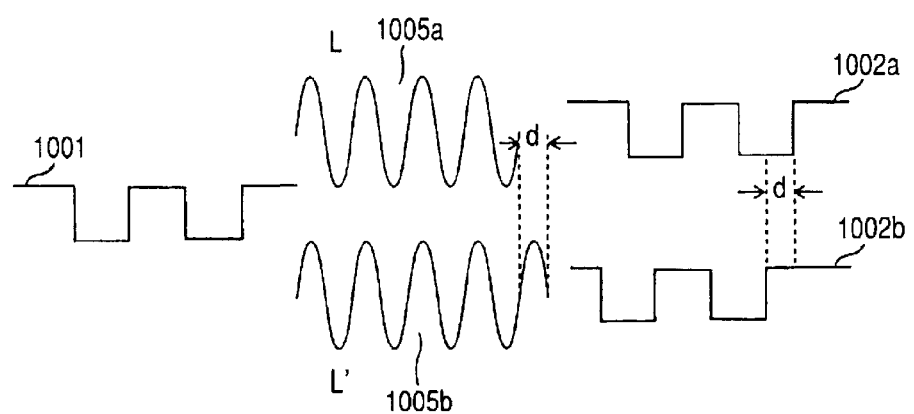
FIG. 4 is a waveform diagram for explaining a phase lag of a modulation signal caused by a difference in length between signal transmission lines.

Now, with reference to FIGS. 3 and 4, explained is means for imparting a time lag to the modulation signal provided from the modulation signal generator 103b with respect to the modulation signal provided from the modulation signal generator 103a.

FIG. 3 schematically shows an example of delaying the phase of a modulation signal in the Mach-Zehnder optical modulator according to the present invention. As shown in the figure, a modulation signal is fed from a tuned modulation signal generator, in the tuned state, to modulator drive signal terminals 901a and 901b and a phase lag can be generated from a difference between lengths L and L' of which are from electrodes 104a, 104b to signal transmission lines 1005a, 1005b. Where the length L' of the signal transmission 1005b is larger than the length L of the signal transmission line 1005a, it is possible to delay the phase of the modulation signal which has passed through the signal transmission line 1005b.

FIG. 4 is a waveform diagram for explaining a phase lag of a modulation signal caused by a difference in length between signal transmission lines. If there is a difference between the length L and L' of the signal transmission lines 1005a and 1005b as in FIG. 3, the phase of the signal passing through the longer signal transmission line 1005b lags. The reference mark "α" in FIG. 4 represents this phase lag. Thus, by selecting the lengths L and L' of the signal transmission lines 1005a and 1005b, the modulation signal generated from the modulation signal generator 103b undergoes a phase lag of ½ clock relative to the modulation signal generated from the modulation signal generator 103a in FIG. 1. Thus, from a tuned modulation signal 1001 there occur modulation signals 1002a and 1002b in accordance with the difference between the length L and L' of the signal transmission lines 1005a and 1005b. It is seen that a signal having a time lag is generated.

Figure 2E:
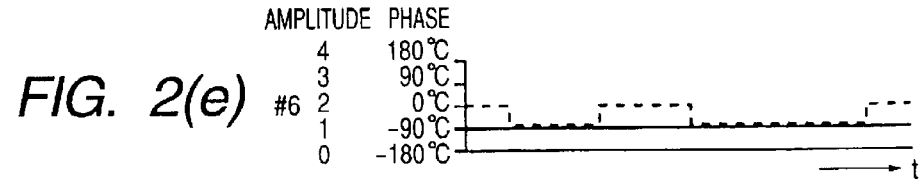
Figure 2F:
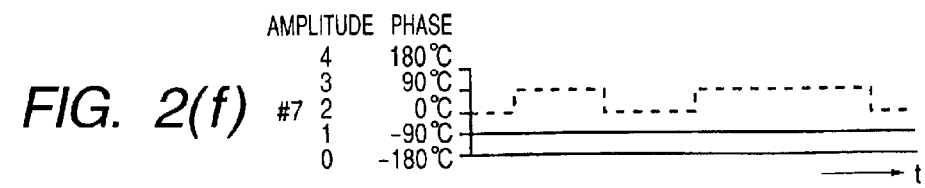

A description will now be given again with reference to FIG. 2. The light signal in the optical waveguide 119c becomes a signal (#6) of amplitude 1 and phase 0 or −0.5π, as shown in FIG. 2E, while the light signal in the optical waveguide 119d becomes a signal (#7) of amplitude 1 and phase 0 or 0.5π, as shown in FIG. 2F. In this embodiment, the modulation signal from the modulation signal generator 103b modulates the light signal in the optical waveguide 119c so as to cause a phase change like 0, −0.5π, 0, −0.5π, −0.5π and modulates the light signal in the optical waveguide 119c so as to cause a phase change like 0, 0.5π, 0, −0.5π, 0.5π. These phase changes are merely one example. Various other changes can occur depending on the contents of data.

The light signals in the optical waveguides 119a and 119b join at a junction 107a, while the light signals in the optical waveguides 119c and 119d join in a junction 107b. The joined signals are amplitude 2, phase 0 signals (#8, #9) as shown in FIGS. 2G and H. These signals become signals (#10, #11) with a phase difference of ±0.5π, as shown in FIGS. 2I and J, by electric fields generated between an electrode 109 and a ground 110a and also between the electrode 109 and a ground 110b in accordance with a signal 108 which is always constant. If both signals have amplitudes when joining at a junction 107c, their phase difference becomes ±π and thus offsets. If only one signal has amplitude, it is impossible to make offset even with the phase difference ±π and there remains the amplitude 2. Therefore, the signal outputted from the optical waveguide 111 becomes an amplitude 2, phase ±0.5π signal (#12), as shown in FIG. 2K. This is twice as fast as the modulation signals generated from the modulation signal generators 103a and 103b, thus permitting the generation of a light signal which exceeds electrical limitations on the modulation signals. Further, by providing Mach-Zehnder modulators in multiple stages, it is made possible to generate an integer-multiple signal. For example, by adding signals #8 and #9 it is possible to obtain a light signal having amplitudes 2 and 4.

Next, second and third embodiments of the present invention will be described below with reference to FIGS. 5, 6, and 7.

Figure 5:
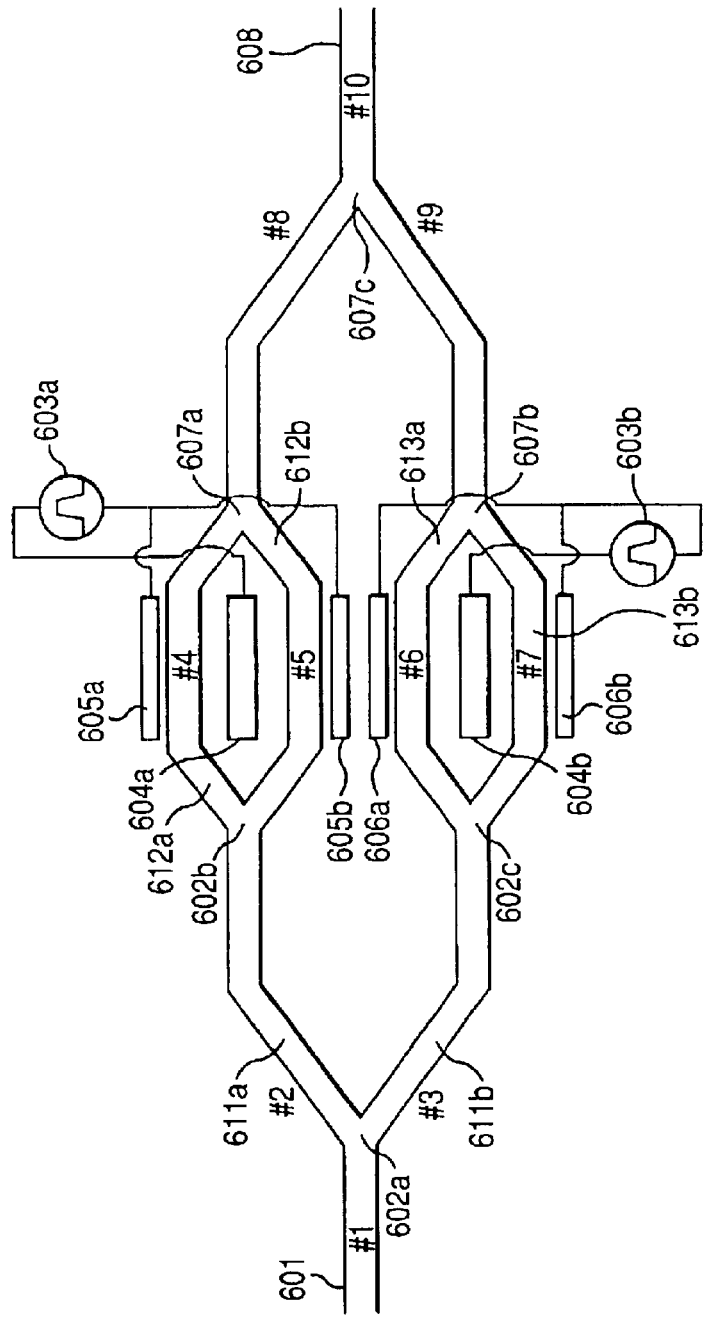
FIG. 5 is a schematic diagram showing a Mach-Zehnder optical modulator according to a second embodiment of the present invention.

FIG. 5 is a schematic diagram showing a Mach-Zehnder optical modulator according to a second embodiment of the present invention. FIG. 6 illustrates light amplitudes and phases in optical waveguides shown in FIG. 5, in which time t is plotted along the axis of abscissa, while phases −180°, −90°, 0°, 90°, and 180°, as well as amplitudes 1, 2, 3, and 4, are read along the axis of ordinate. The phase and amplitudes are indicated with dotted lines and solid lines, respectively.

Figure 6A:
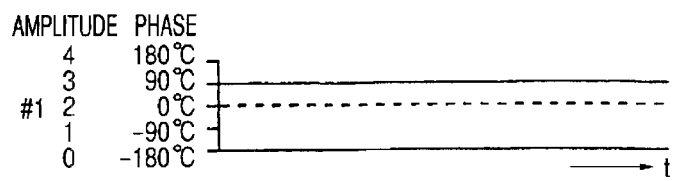
FIG. 6 is a diagram showing amplitudes and phases of light signals in optical waveguides shown in FIG. 5.
Figure 6B:
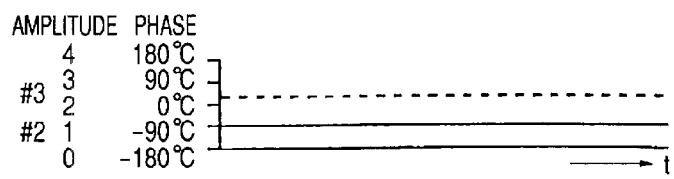
Figure 6C:
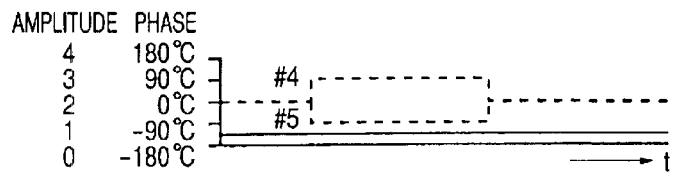

Assuming that a light signal guided by an optical waveguide 601 is a signal (#1) of amplitude 3, phase 0, as shown in FIG. 6A, the light signal is divided into two light signals at a branch point 602a for branching to two optical waveguides of different sectional areas. For example, if a sectional area of an optical waveguide 611a is 1 and that of an optical waveguide 611b is 2, the signal in the optical waveguide 611a becomes a signal (#2) of amplitude 1, phase 0, and the signal in the optical waveguide 611b becomes a signal (#3) of amplitude 2, phase 0, as shown in FIG. 6B. Further, the signal in the optical waveguide 611a is branched at a branch point 602b to optical waveguides 612a and 612b of the same sectional area. Likewise, the signal in the optical waveguide 611b is branched at a branch point 602c to optical waveguides 613a and 613b of the same sectional area. The light signals guided by the optical waveguides 612a and 612b undergo a change in phase by electric fields generated between an electrode 604a and a ground 605a and also between the electrode 604a and a ground 605b in accordance with a modulation signal generated from a modulation signal generator 603a. The thus phase-changed signals become a signal (#4) of amplitude 0.5, phase 0 or +0.5π, and a signal (#5) of amplitude 0.5, phase 0 or −0.5 π, respectively, as shown in FIG. 6C. As to which of these phases is to be continued and for what period, they vary depending on the contents of data. FIG. 6 merely shows one example.

Figure 6D:
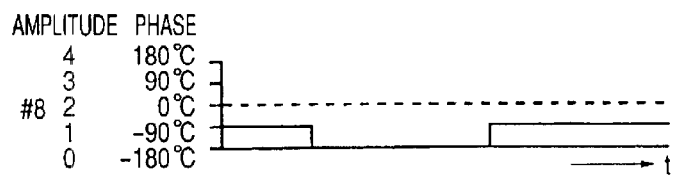
Figure 6E:
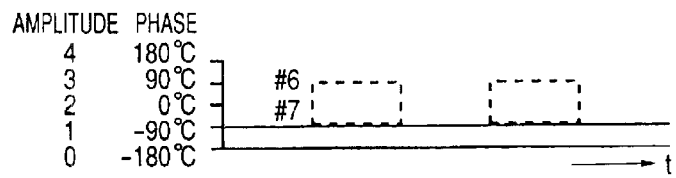
Figure 6F:
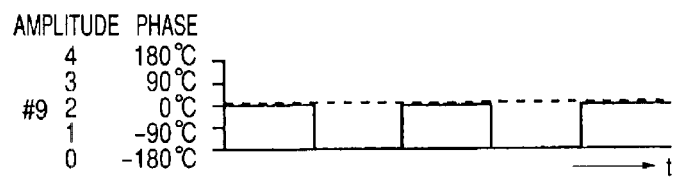
Figure 6G:
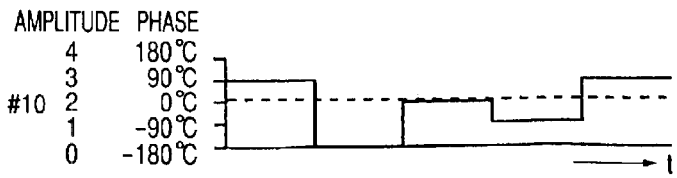

Likewise, the light signals branched at the branch point 602c to the optical waveguides 613a and 613b undergo a change in phase by electric fields generated between an electrode 604b and a ground 606a and also between the electrode 604b and a ground 606b in accordance with a modulation signal provided from a modulation signal generator 603b. The thus phase-changed signals become a signal (#6) of amplitude 1, phase 0 or +0.5π, and a signal (#7) of amplitude 1, phase 0 or −0.5π, respectively, as shown in FIG. 6E. The signals (#4, #5) and (#6, #7) join at junctions 607a and 607b, respectively, into a signal (#8) of amplitude 1, phase 0, as shown in FIG. 6D and a signal (#9) of amplitude 2, phase 0, as shown in FIG. 6F. Both signals (#8, #9) then join together at a junction 607c. At this time, if both signals have respective amplitudes, the amplitudes are combined into 3, while if there is amplitude on only one side, the amplitude becomes 1 or 2 according to the associated signal. If both signals do not have any amplitude, the value of amplitude becomes 0 and the joined signal is conducted to an optical waveguide 608. Thus, the signal outputted from the optical waveguide 608 becomes a signal (#10) shown in FIG. 6G which has four types of amplitudes 0, 1, 2, 3. This is a quaternary value having an information volume twice as large as that of the binary value of the modulation signals generated by the modulation signal generators 603a and 603b, thus permitting generation of a light signal able to transmit information twice as much while maintaining the modulation signal speed. Further, by using various sections of branches and providing Mach-Zehnder modulators in multiple stages, it becomes possible to generate a signal having an integer multiple of information volume.

In the embodiment illustrated in FIG. 5, waveguides of different sectional areas are provided at the waveguide branch point 602a to branch into signals of different quantities of light toward the branch points 602b and 602c. But there may be adopted such a construction as shown in FIG. 7.

Figure 7:
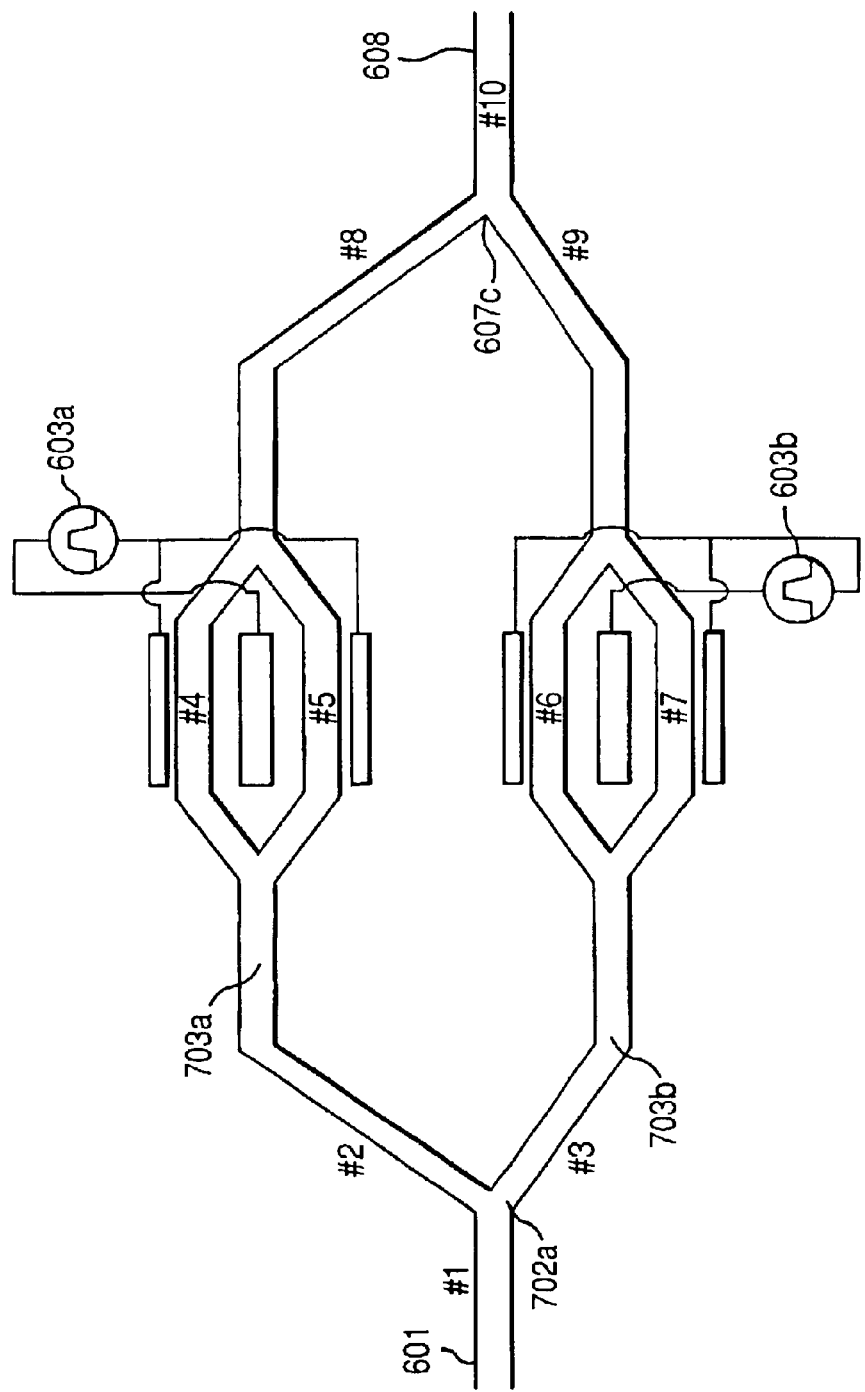
FIG. 7 is a schematic diagram showing a Mach-Zehnder optical modulator according to a third embodiment of the present invention.

FIG. 7 is a schematic diagram of a Mach-Zehnder optical modulator according to a third embodiment of the present invention. In the previous embodiment illustrated in FIG. 5 there is made branching into optical waveguides of different sectional areas at the branch point 602a, while in this third embodiment there is made branching at different angles into optical waveguides 703a and 703b, which branching is made at a branch point 702a, thereby making division into signals of different light quantities for the optical waveguides 703a and 703b.

Now, with reference to FIGS. 8 and 9, a description will be given below about a fourth embodiment of the present invention.

FIG. 8 is a schematic diagram of a Mach-Zehnder optical modulator according to a fourth embodiment of the present invention. FIG. 9 illustrates amplitudes and phases of light signals in optical waveguides, in which time t is plotted along the axis of abscissa, while phases −180°, −90°, 0°, 90°, 180°, as well as amplitudes 1, 2, 3, 4, are read along the axis of ordinate. The phases and amplitudes are represented by dotted lines and solid lines, respectively.

Figure 9A:
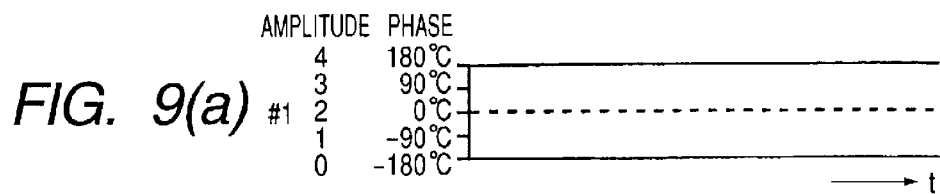
FIG. 9 is a diagram showing amplitudes and phases of light signals in optical waveguides shown in FIG. 8.
Figure 9B:
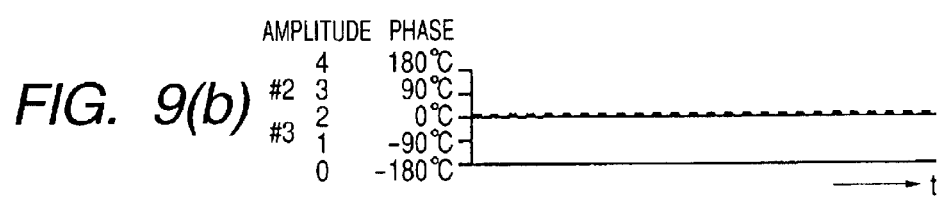
Figure 9C:
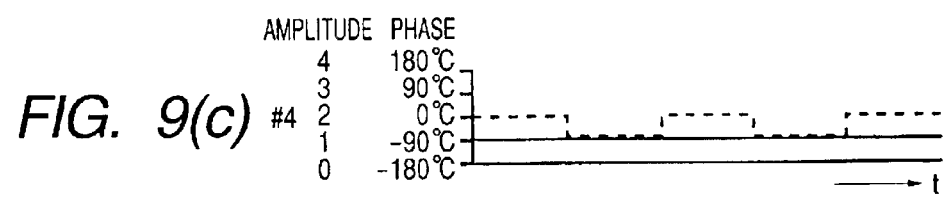
Figure 9D:
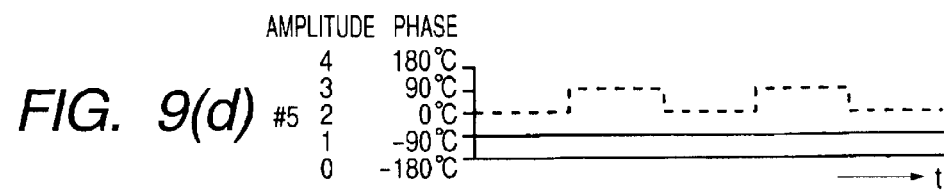
Figure 10:
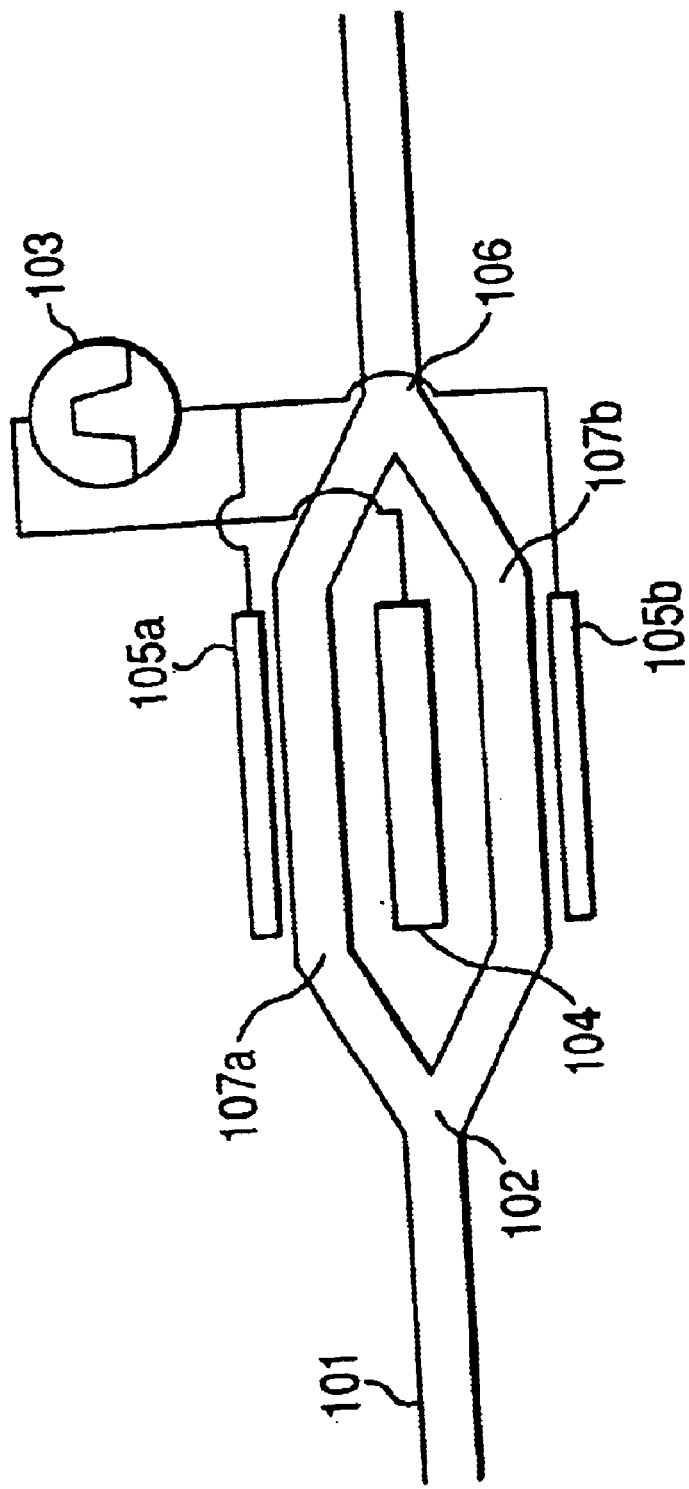
FIG. 10 is a schematic diagram showing a schematic construction of a conventional Mach-Zehnder optical modulator.
Figure 11:
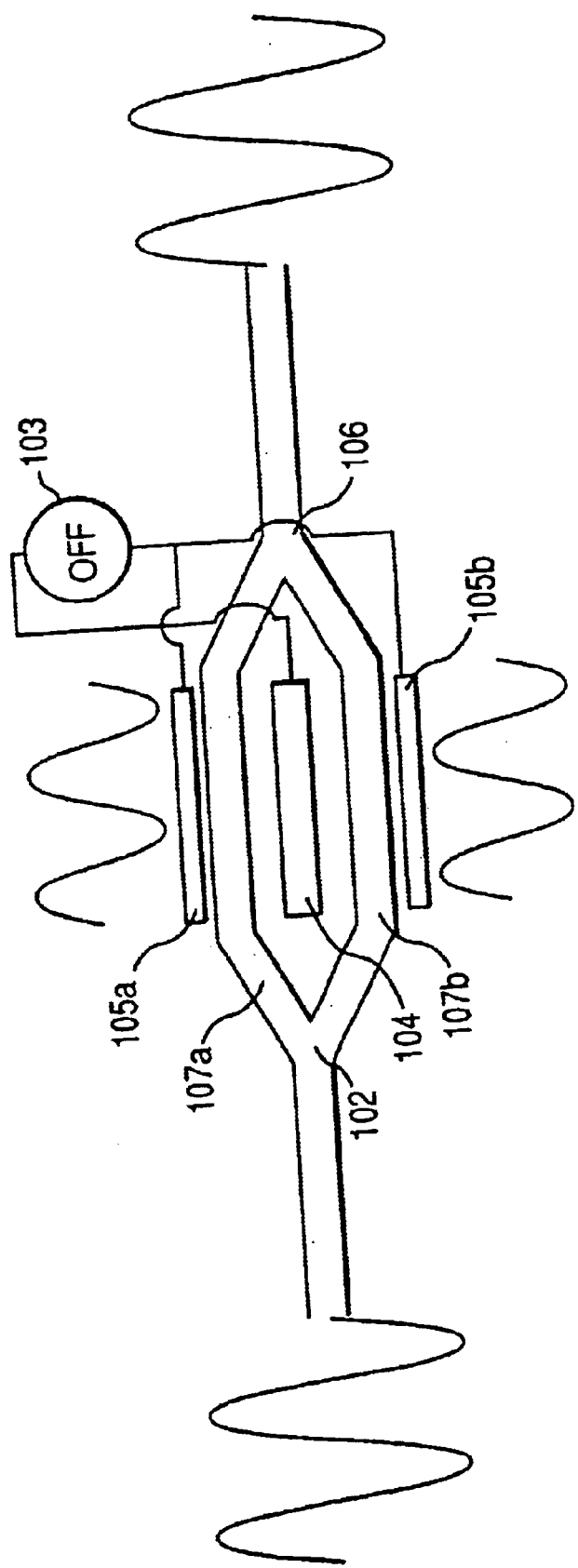
FIG. 11 also illustrates schematically the conventional Mach-Zehnder optical modulator.
Figure 12:
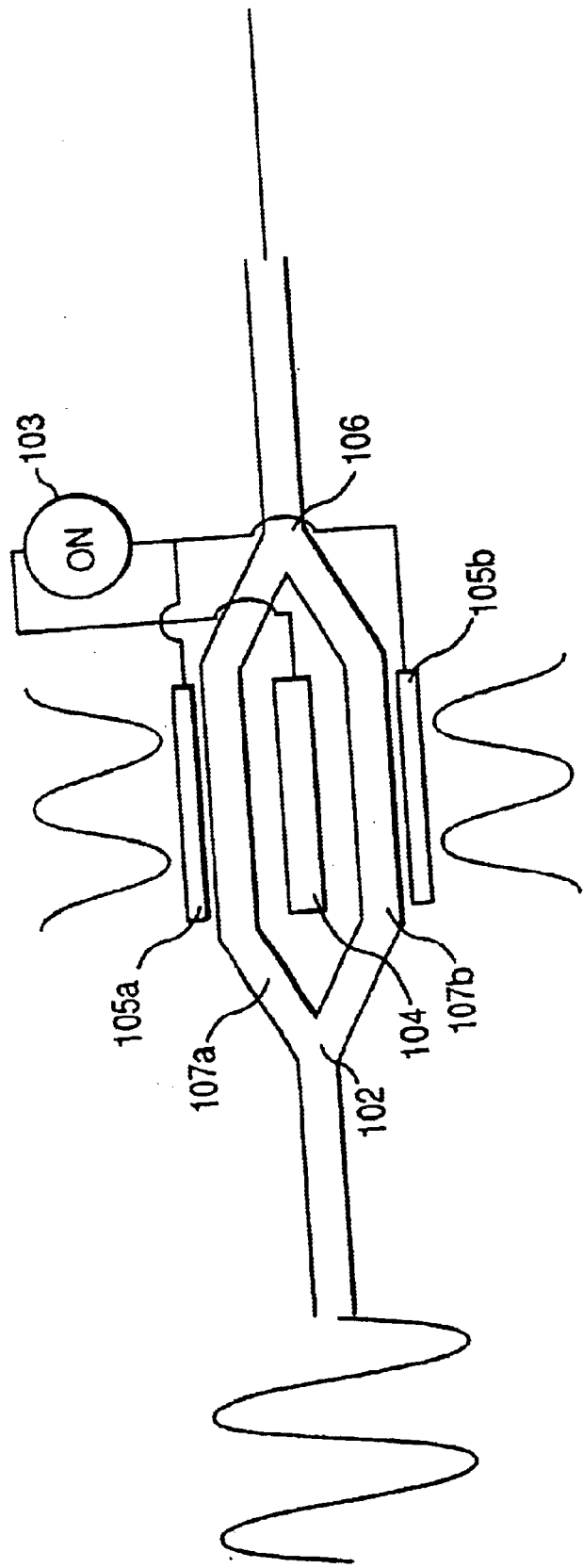
FIG. 12 further illustrates schematically the conventional Mach-Zehnder optical modulator.

As shown in FIG. 9A, a signal guided by an optical waveguide 101 in FIG. 8 is a signal (#1) having an amplitude of unit 4 and phase 0, i.e., an amplitude 4, phase 0 signal. This signal is divided into two signals at a branch point 102a of the optical waveguide, which signals are then guided by optical waveguides 118a and 118b respectively. As shown in FIG. 2B, the light signals in the optical waveguides 118a and 118b are light signals (#2, #3) having an amplitude of unit 2 and phase 0, i.e., amplitude 2, phase 0 signals. The light signal in the optical waveguide 118a is divided into two light signals at a branch point 102b provided in the optical waveguide 118a. The light signals thus divided at the branch point 102b is guided by optical waveguides 119a and 119b respectively. The optical waveguide 119a is disposed between an electrode 104a and a ground 105a and the optical waveguide 119b is disposed between the electrode 104a and a ground 105b, so that electric fields are generated in the optical waveguides 119a and 119b in accordance with a modulation signal provided from a modulation signal generator 103a and the phases are changed with the electric fields. The signal in the optical waveguide 119a becomes a signal (#4) of amplitude 1, phase 0 or −0.5π, as shown in FIG. 9C, while the signal in the optical waveguide 119b becomes a signal (#5) of amplitude 1, phase 0 or 0.5π, as shown in FIG. 9D. The signals in both optical waveguides 119a and 119b are joined at a junction 107a into an optical signal (#8) of amplitude 2, phase 0, as shown in FIG. 9E, which signal is then conducted to an optical waveguide 120a.

The optical waveguide 120a is disposed between an electrode 109 and a ground 110a, while the optical waveguide 118b is disposed between the electrode 109 and a ground 110b, and a modulation signal which lags (or leads) ½ clock with respect to the modulation signal generated from the modulation signal generator 103a is fed to the electrode 109 and the ground 110a or 110b from a modulation signal generator 108. Consequently, as shown in FIG. 9F, the light signal in the optical waveguide 120a becomes a light signal (#10) of amplitude 2 or 0, phase 0 or −0.5π, which lags ½ clock in comparison with FIG. 9E. Further, as shown in FIG. 9G, the light signal in the optical waveguide 118b becomes a light signal (#11) of amplitude 2, phase 0 or +0.5π. The light signals in the optical waveguides 120a and 118b are combined together at a branch point 107c into an optical signal (#12) of amplitude 4, 2, or 0, phase 0 or +0.5π, as shown in FIG. 9H. Thus, there is obtained a multi-value signal permitting a high-speed transmission in comparison with the modulation signal generated by the driving modulation signal generator.

According to the present invention, as described above, by combining optical waveguides each having a Mach-Zehnder modulator there can be obtained an optical modulator which can generate a light signal higher in speed and/or larger in information volume than a modulation signal generated by a modulation signal generator.

In the present invention, as set forth above, there is attained a transmission speed higher by an integer multiple than the driver signal speed.

Also, by setting multi-value amplitudes there is attained an information transmission volume corresponding to an integer multiple of a single driver while leaving the transmission speed intact.

The foregoing invention has been described in terms of preferred embodiments. However, those skilled, in the art will recognize that many variations of such embodiments exist. Such variations are intended to be within the scope of the present invention and the appended claims.

What is claimed is:

1. A Mach-Zehnder optical modulator comprising:
a first modulation signal generator for generating a first modulation signal to modulate light signals guided by first and second optical waveguides, the modulation being conducted so that the phases of the light signals become opposite to each other; and
a second modulation signal generator for generating a second modulation signal to modulate light signals guided by third and fourth optical waveguides, the modulation being conducted so that the phases of the light signals become opposite to each other, wherein
the transmission speed or the amount of information transmitted is increased in accordance with the modulation signals provided from the first and second modulation signal generators.

2. A Mach-Zehnder optical modulator according to claim 1, further comprising:
means for generating a phase shift between the first and second modulation signals generated from the first and second modulation signal generators respectively, wherein
phase is changed between the light signals in the first and second optical waveguides and the light signals in the third and fourth optical waveguides, then the light signals are combined and outputted.

3. A Mach-Zehnder optical waveguide according to claim 2, wherein the distance between the first modulation signal generator and an electrode to which the first modulation signal is applied and the distance between the second modulation signal generator and an electrode to which the second modulation signal is applied can be made different from each other to create a phase difference between the first and second modulation signals.

4. A Mach-Zehnder optical modulator according to claim 1, further comprising:
means for generating a phase shift between the first and second modulation signals generated from the first and second modulation signal generators respectively, wherein
the third optical waveguide is a joined optical waveguide of both the first and the second optical waveguide.

5. A Mach-Zehnder optical waveguide according to claim 4, wherein the distance between the first modulation signal generator and an electrode to which the first modulation signal is applied and the distance between the second modulation signal generator and an electrode to which the second modulation signal is applied can be made different from each other to create a phase difference between the first and second modulation signals.

6. A Mach-Zehnder optical modulator according to claim 1, wherein the quantity of light passing through the first and second optical waveguides and that of light passing through the third and fourth optical waveguides are made different from each other, and the first to fourth optical waveguides are joined together to provide an output.

7. A Mach-Zehnder optical modulator according to claim 6, wherein the first and second optical waveguides and the third and fourth optical waveguides are made different from each other in the size of sectional area.

8. A Mach-Zehnder optical modulator according to claim 6, further comprising:
a first upstream optical waveguide disposed upstream of the first and second optical waveguides,
a second upstream optical waveguide disposed upstream of the third and fourth optical waveguides, and
a main optical waveguide disposed upstream of the first and second upstream optical waveguides, wherein
when light is branched from the main upstream optical waveguide to the first and second upstream optical waveguides, an output angle of light from the main upstream optical guide to the first upstream optical guide and that of light from the main upstream optical guide to the second upstream optical guide are set different from each other.

* * * * *